June 5, 1956 C. ZELLWEGER Re. 24,163

VALVES FOR FILLING PYROPHORIC LIGHTERS FOR LIQUIFIED GAS

Original Filed March 12, 1953 2 Sheets-Sheet 1

INVENTOR

Conrad Zellweger.

BY

ATTORNEY

VALVES FOR FILLING PYROPHORIC LIGHTERS FOR LIQUIFIED GAS

Original Filed March 12, 1953 2 Sheets-Sheet 2

INVENTOR
Conrad Zellweger.

BY

ATTORNEY

United States Patent Office

Re. 24,163
Reissued June 5, 1956

24,163

VALVES FOR FILLING PYROPHORIC LIGHTERS FOR LIQUIFIED GAS

Conrad Zellweger, Pregny, Geneva, Switzerland, assignor to La Nationale S. A., Geneva, Switzerland, a company of Switzerland Original No. 2,710,506, dated June 14, 1955, Serial No. 341,881, March 12, 1953. Application for reissue January 13, 1956, Serial No. 559,092

Claims priority, application Switzerland March 17, 1952

12 Claims. (Cl. 62—1)

Matter enclosed in heavy brackets [ ] appears in the original patent but forms no part of this reissue specification; matter printed in italics indicates the additions made by reissue.

Filling valves are already known for liquified gas pyrophoric lighters, in which the reservoir of the lighter is connected to a filling container containing liquified gas, through a hollow needle passing through a plug of the last mentioned container.

These known valves have the disadvantage either of not ensuring absolute fluidtightness, or of necessitating the use of gas at a pressure considerably greater than that which [remains] *obtains* normally in *conjunction with* the liquid state, which is effected by the addition, in the filling container, of a non-liquified gas under pressure. It thus results that the filling containers must have qualities of resistance which very substantially increase the cost of the construction.

On the other hand, when it is desired to fill the reservoir of a lighter with liquified gas, at its normal *vapor* pressure, the [gas] *fuel* entering the reservoir partly expands and creates a pressure which prevents complete filling.

The present invention has for its subject a filling valve for a lighter with liquified gas, fitted with a hollow needle enabling the connection of the reservoir of the lighter to a filling container containing liquified gas at its normal pressure. This valve permits of avoiding the above mentioned disadvantages by the fact that it comprises two parts, movable one relatively to the other, one being stationary and secured to the body of the lighter, said two parts being so arranged as to be capable of occupying two relative positions, one for closing and the other for filling, in which the reservoir of the lighter is connected, on the one hand, to the hollow needle, and, on the other hand, to the outer air through another passage of small cross-sectional area.

A number of forms of construction of the subject of the invention are shown by way of example in the accompanying drawings, wherein:

Fig. 4 shows a second form of construction in the closed position and in

Figure 5:
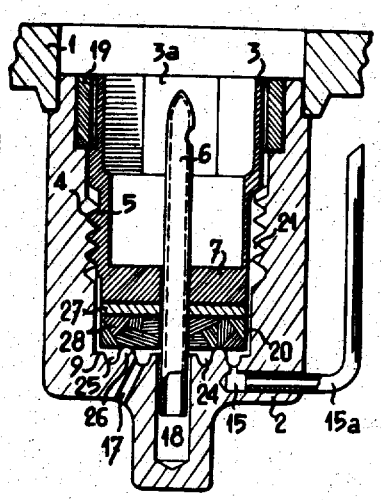

Fig. 5 in the filling position.

In all the figures of the drawings, the same reference numerals indicate corresponding parts.

Figure 1:
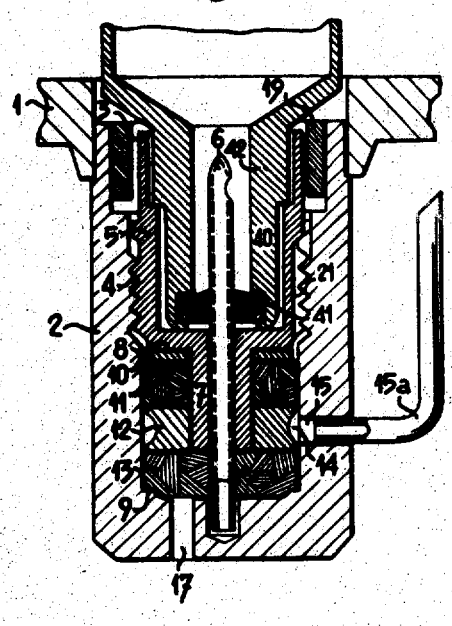
Fig. 1 is a sectional view of a first form of construction in the closed position with the neck of the filling container in engagement with the valve.
Figure 2:
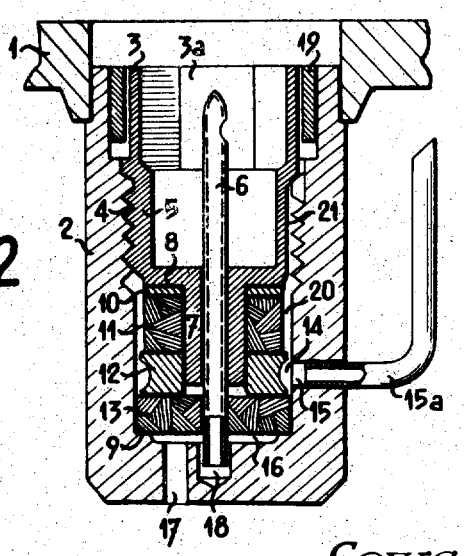
Fig. 2 is a sectional view in the filling position.

Referring to Figs. 1 and 2, the wall of the reservoir of the lighter is indicated by 1. The valve comprises two parts 2 and 3 movable one relatively to the other, the first or fixed part 2 being secured to the wall 1 and having a central recess *or socket therein* with cylindrical walls threaded at 4 on a portion of its length. The movable part 3 is formed by a body with cylindrical walls having on its part 5 a screw-thread which comes into engagement with the threaded portion 4. A groove 21 is milled in the threaded part 5.

The body part 3 also has a central recess, along the axis of which is located the hollow needle 6. The said needle is secured in an elongated collar portion 7 of the part 3, which is of smaller diameter, so that a shoulder 8 is formed. The portion 3a of the part 3 has a six-sided surface into which enters, when filling, a part corresponding with the neck of the filling container. In this manner, the filling container serves at the same time as a key for operating the valve.

Between the shoulder 8 of the part 3 and the bottom 9 of the recess of the part 2 are located a metal washer 10, a rubber ring 11, a metal ring 12 and a rubber washer 13.

As shown in the drawing, the ring 11 is of a diameter slightly smaller than that of the recess of the body 2 in which it is located. The same applies to the metal ring 12. On the contrary, these two parts are adjusted on the elongated collar portion 7 of the part 3. The ring 12 is provided with a peripheral groove 14, opposite which opens a calibrated passage 15 of small cross-sectional area, passing through the wall of the part 2 and extended into the reservoir of the lighter by a tube 15a ending in proximity to the wall of the chamber 1 constituting the bottom of the lighter.

In the bottom 9 of the part 2 is formed a recess 16 into which leads a passage 17 passing through the wall of the said part 2 and leading into the reservoir of the lighter. At the centre of the bottom 9 is located a drill recess 18 in which is located the rear end of the hollow needle 6.

A ring 19, driven with force into the opening of the part 2, prevents the part 3 passing out completely when it is unscrewed for bringing the parts of the valve into the position shown in Fig. 2. Between the ring 19 and the lower end of the body 3 is provided a clearance leaving free a circular opening.

In Fig. 1 the key neck 40 of a filling container such as shown in my co-pending application Serial No. 341,882, filed March 12, 1953 *now Patent No. 2,711,082 issued June 21, 1955* is shown in engagement with the valve. It will be seen that the needle 6 has passed through the plug 41 closing the neck and that a part 42 of the latter, having a profile with six faces corresponding with that of the part 3a of the movable part 3, is in engagement with the latter, which enables it to move angularly relatively to the stationary part 2.

In the position shown in Fig. 2, it will be seen that when the hollow needle 6 has passed through the plug 41 of the filling container of liquid gas, of which the neck is introduced into the recess of the part 3, the liquid gas can pass through the needle, the bore 18, the recess 16 and the passage 17 for entering the reservoir of the lighter.

The air and a portion of the expanded gas contained in the latter, escape through the tube 15a, the calibrated passage 15, the space 20, between the ring 11 and the wall of the part 2, the milling 21 and the free circular space between the ring 19 and the part 3. The calibrated passage 15 is so dimensioned that the pressure in the interior of the reservoir is slightly less than the vapour tension of the liquified gas.

It is thus possible to fill completely the reservoir of the lighter and the user sees easily when the filling has been effected, as at this moment the liquid gas commences to pass out through the point between the ring 19 and the part 3.

It then suffices to screw the part 3 into the body 2 by means of the neck of the filling container in engagement with the part 3a.

There is thus effected the compression of the ring 11 and the washer 13. The first bears against the wall of the part 2 and eliminates the free space 20, whilst the second fills the recess 16 and closes the passage 17.

Thus any communication between the reservoir of the lighter by its passages 15 and 17 is closed.

Figure 3:
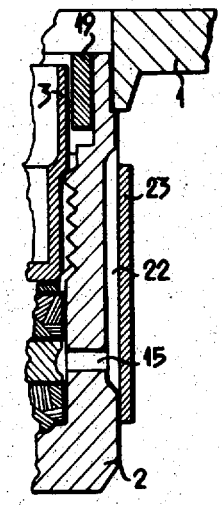
Fig. 3 shows a modification of a detail.

Instead of the tube 15a, it is also possible to provide the modification shown in Fig. 3. In this case, the passage 15 leads into a circular milling or recess 22 covered by a sleeve 23 driven on to the part 2.

Figure 4:
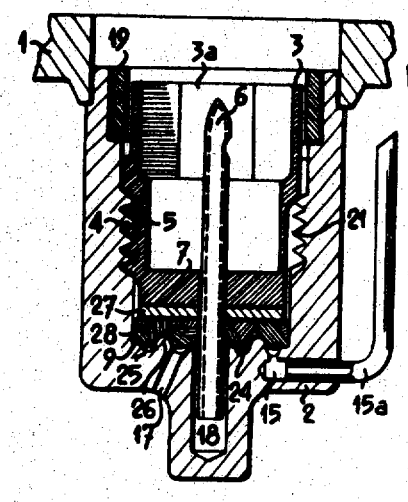

With reference to Figs. 4 and 5, it will be seen that the part 3 has a bottom 7 through which passes the hollow needle 6 which is welded thereto.

The bottom 9 of the part 2 has two circular grooves 24 and 25 between which is provided a rib 26 forming a projection on the bottom 9.

The passage 15, 15a is connected to the groove 25 and the passage 17 to the groove 24.

Between the bottom 7 of the part 3 and the bottom 9 of the part 2 are located a metal washer 27 and a washer 28 of rubber which allows a clearance to subsist between them and the wall of the part 2.

In this form of construction it will be seen in Fig. 5 that, as in the preceding form of construction, the liquid gas from the filling container can pass through the hollow needle, the cavity 18, the free space between the washer 28 and the rib 26 and the passage 17. The air and a portion of the expanded gas escape through the passage 15, 15a, the free space 20 between the washer 28 and the rib 26, the milling 21 and the free space between the ring 19 and the part 3.

In the closed position shown in Fig. 4, the tightening of the part 3 in the part 2 produces the crushing of the washer 28 which bears against the walls of the part 2 and enters the grooves 24, 25 thus closing any communication of the reservoir of the lighter with the outside.

From the foregoing it will now be observed that the present invention includes a pair of cup-like outer and inner valve members 2 and 3, respectively, which are telescopically fitted for relative angular and axial movement. The outer of said members having a gas escape port 15 and a filler port 17 while the threads 4 of the inner member 3 are provided with a groove 21 which constitutes an escape channel for venting gas passing through escape port 15 to the atmosphere. The inner member 3 carries the hollow needle 6 and is also provided with key-means at its mouth for receiving the key portion of a filler container which when interlocked with the member 3 permits of relative turning movement of the latter by appropriate manipulation of the container itself. The valve seat closure means is controlled by the axial movement of the member 3 to alternately close or seal the ports 15 and 17, and, on the other hand, to open them simultaneously when the reservoir of the casing is to be filled.

It will be understood that the parts of rubber referred to in the above description may be of a synthetic or other material having qualities of elasticity or deformability similar to those of rubber.

I claim:

1. In a [pyrophoric] lighter for liquified gas, the combination including, a casing having a reservoir, filler valve means for the reservoir, comprising, a fixed valve member having a tubular wall provided over a part of its length with interior threads, said valve member secured to and extending within the casing and opening at its outer end to the atmosphere and also having a reservoir gas escape port in the side wall thereof, a transverse wall at the inner end of the fixed valve member providing an internal valve seat at one side of the gas escape port, said wall having a fluid inlet port communicating with the reservoir, a movable valve member having external threads interrupted by a transverse milled groove leading to the atmosphere, said threads engaging the interior threads on the said tubular wall of the fixed valve member, and said movable valve member also having its open outer end of a cross section to form key means to receive the mating key neck of a filler container whereby rotation of the container will cause said movable valve member to move angularly and axially relative to the fixed valve member when they are interlocked, a transverse wall at the inner end of the movable valve member, a hollow needle in said transverse wall and pointed and laterally ported at its outer end and its inner end opening below said valve seat, and valve seat closure means carried by the movable member and located between the transverse wall on the movable valve member and the valve seat on the fixed valve member and normally covering said inlet port, and whereby, upon axial outward movement of the movable valve member said valve seat means will uncover said filler port to let fuel into the reservoir and simultaneously permit the gas escape port to communicate with the milled groove to vent gas trapped in the reservoir to the atmosphere through said milled groove.

2. A [pyrophoric] lighter according to claim 1 wherein, the transverse wall at the inner end of the fixed valve member has a socket for receiving the inner end of the hollow needle.

3. A [pyrophoric] lighter according to claim 1 wherein, the valve seat closure means includes deformable sealing means surrounding the inner end of the hollow needle, said sealing means when compressed closing both the inlet port in the valve seat and blocking communication between the gas escape port and the atmosphere, and when relaxed uncovering the inlet port and unblocking communication between the gas escape port and the atmosphere.

4. A [pyrophoric] lighter according to claim 1, wherein the gas escape port is provided with a tube, a portion of said tube being bent to extend parallel to the outer side of the fixed valve member.

5. A pyrophoric lighter according to claim 1 wherein, the gas escape port has its inlet end communicating with a groove in the outer wall of the fixed valve member, and a shield overlies all of said groove except its entrance end.

6. A [pyrophoric] lighter according to claim 1 wherein, the valve seat closure means includes spaced outer and inner deformable elements and an intermediate element having a peripheral groove, all of said elements disposed coaxially with the hollow needle and confined between the transverse wall of the movable valve member and the valve seat, the inner deformable element for the valve seat being axially compressible to close the fluid inlet and the outer element being laterally compressible to block communication between the gas escape port and the transverse milled groove when the reservoir is being filled, said inner deformable element when relaxed establishing communication between the needle and the inlet port, said outer deformable element when relaxed establishing communication between the gas escape port and the milled groove, through the peripherally grooved intermediate member.

7. A [pyrophoric] lighter according to claim 1, wherein, the valve seat is formed with ribs and intervening valleys, and the valve seat closure means includes a single deformable element for controlling the opening and closing of both the fluid inlet port and the gas escape port.

8. A [pyrophoric] lighter for liquified gas including in combination, a casing having a reservoir, and filler means for the reservoir carried by the casing and permitting simultaneous escape of gas trapped in the reservoir and the filling thereof with liquid fuel, said means including a pair of cup-like outer and inner valve members telescopically interfitted for relative axial movement, the outer of said members having therebetween groove means for venting gas trapped in the reservoir to the atmosphere and also having filler and gas escape ports spaced axially of said outer member for communication with the reservoir, a hollow needle carried by the inner valve member for conducting liquid fuel from a filler container to the reservoir, key means at the mouth of the inner valve member for co-operation with related key means on the filler container whereby relative turning movement between the container and the inner valve member will rotate the latter, and closure means carried by and movable with the inner valve member for alternately sealing the filler and gas escape ports and also simultaneously opening the filler port to the reservoir and the gas escape port to said groove means for venting gas trapped in the reservoir to the atmosphere.

*9. A lighter constructed to be charged with liquified gas fuel under pressure and including in combination, a casing having therein a fuel reservoir, and fuel charging means carried by the casing and affording simultaneous escape of gas from the reservoir and the charging thereof with liquified gas fuel under pressure, said fuel charging means including an outer valve member fixed with respect to the casing and having therein a socket, an inner valve member mounted to move in said socket between open and closed positions as hereinafter set forth, said inner valve member having a fuel charging passage extending therethrough from an outer portion to an inner portion thereof, said outer portion including a part engageable with a filling container to afford a flow of fuel from such a container to said fuel charging passage, said fuel charging means being constructed to provide an outwardly extending passage affording the outward escape of gas therethrough to the outer air during charging, said fuel charging means also including sealing means activated during movement of said inner valve member between closed and open positions, said last mentioned means providing a seal against the flow of fuel through the passage in said inner valve member into said reservoir when said inner valve member is in closed position, and also providing a seal against the flow of fuel outwardly from said reservoir through said escape passage when said inner valve member is in closed position; said sealing means affording communication through the passage in said inner valve member into said reservoir when said inner valve member is in open position, and also affording communication from said reservoir through said escape passage to the outer air when said inner valve member is in open position.*

*10. A lighter constructed to be charged with liquified gas fuel under pressure and including in combination, a casing having therein a fuel reservoir, and fuel charging means carried by the casing and affording simultaneous escape of gas from the reservoir and the charging thereof with liquified gas fuel under pressure, said fuel charging means including an outer valve member fixed with respect to the casing and having therein a socket, an inner valve member mounted to move in said socket between open and closed positions as hereinafter set forth, said inner valve member having a fuel charging passage extending therethrough from an outer portion to an inner portion thereof, said outer portion including a part engageable with a filling container to afford a flow of fuel from such a container to said fuel charging passage, said fuel charging means being constructed to provide an outwardly extending passage affording the outward escape of gas therethrough to the outer air during charging, said fuel charging means also including sealing means activated during movement of said inner valve member between closed and open positions, said last mentioned means sealing the inner portion of said passage in said inner valve member from communication with said reservoir when said inner valve member is in closed position and also providing a seal against the flow of fuel outwardly from said reservoir through said escape passage when said inner valve member is in closed position; said sealing means affording communication between the inner portion of said passage through the inner valve member and said reservoir when said inner valve member is in open position and also affording communication from said reservoir through said escape passage to the outer air when said inner valve member is in open position.*

*11. A lighter constructed to be charged with liquified gas fuel under pressure and including in combination, a casing having therein a fuel reservoir, and fuel charging means carried by the casing and affording simultaneous escape of gas from the reservoir and the charging thereof with liquified gas fuel under pressure, said fuel charging means including an outer valve member fixed with respect to the casing and having therein a socket, an inner valve member mounted to move in said socket between open and closed positions as hereinafter set forth, said inner valve member including a hollow needle protruding outwardly from the body of said valve member into said socket, said inner valve member having a fuel charging passage therein which extends from the protruding portion of said needle through an inner portion of said inner valve member, said fuel charging means being constructed to provide a passage extending outwardly through said socket between said inner and outer valve members to afford the outward escape of gas through said last mentioned passage to the outer air during charging, sealing means activated during movement of said inner valve member between closed and open positions, said last mentioned means sealing the inner portion of said first mentioned passage in said inner valve member from communication with said reservoir when said inner valve is in closed position, and also providing a seal against the flow of fuel outwardly from said reservoir through said escape passage when said inner valve member is in closed position; said sealing means affording communication between said reservoir and the inner portion of said first mentioned passage through the inner valve member when said inner valve member is in open position, and also affording communication between said reservoir and said escape passage when said inner valve is in open position.*

*12. A lighter constructed to be charged with liquified gas fuel under pressure and including in combination, a casing having therein a fuel reservoir, and fuel charging means carried by the casing and affording simultaneous escape of gas from the reservoir and the charging thereof with liquified gas fuel under pressure, said fuel charging means including an outer valve member fixed with respect to the casing and having therein a socket, an inner valve member mounted to move in said socket between open and closed positions as hereinafter set forth, said fuel charging means being constructed to provide an outwardly extending passage affording the outward escape of gas therethrough from said reservoir to the outer air during charging and also to provide inward passage of liquified gas therethrough in said reservoir during charging, in a path different from the path of said outwardly escaping gas, said inner valve member having an outer portion provided with a part engageable with a filling container to afford flow of fuel from such a container to said inward passage, said fuel charging means including sealing means activated during movement of said inner valve member between closed and open positions, said last mentioned means sealing the inner portions of said passages against communication with said fuel reservoir and also against communication with each other when said inner valve member is in closed position, said sealing means opening communication from said reservoir through each of said passages when said inner valve member is in open position.*

References Cited in the file of this patent or the original patent

UNITED STATES PATENTS

| | | |
|---|---|---|
| 1,933,192 | Taylor | Oct. 31, 1933 |
| 2,204,015 | Iftiger | June 11, 1940 |

(Other references on following page)

UNITED STATES PATENTS

| | | |
|---|---|---|
| 2,347,010 | Ward | Apr. 18, 1944 |
| 2,348,083 | McCabe | May 2, 1944 |
| 2,482,794 | Peterson | Sept. 27, 1949 |
| 2,553,919 | Hug | May 22, 1951 |
| 2,594,755 | Felt | Apr. 29, 1952 |
| 2,608,081 | Morgan | Aug. 26, 1952 |
| 2,643,535 | Strumbos | Jan. 30, 1953 |
| 2,644,630 | Schroeder | July 7, 1953 |
| 2,675,689 | Wassem | Apr. 20, 1954 |

| | | |
|---|---|---|
| 2,676,475 | Nissen | Apr. 27, 1954 |
| 2,679,140 | Burchett | May 25, 1954 |
| 2,708,347 | Cameron | May 17, 1955 |
| 2,712,322 | Fortin | July 5, 1955 |
| 2,717,720 | Nissen | Sept. 13, 1955 |
| 2,725,721 | Gruber | Dec. 6, 1955 |

FOREIGN PATENTS

| | | |
|---|---|---|
| 677,327 | Great Britain | Aug. 13, 1952 |
| 681,579 | Great Britain | Oct. 29, 1952 |